United States Patent Office 3,666,551
Patented May 30, 1972

3,666,551
IMPREGNATING AND COATING COMPOSITION
FOR POROUS CERAMIC INSULATION
Lawrence G. Bockstie, Jr., Bradford, Pa., assignor to
Corning Glass Works, Corning, N.Y.
No Drawing. Original application Dec. 8, 1967, Ser. No.
688,974, now Patent No. 3,575,916, dated Apr. 20,
1971. Divided and this application Dec. 4, 1969, Ser.
No. 882,352
Int. Cl. B44d 1/18; H01b 3/00
U.S. Cl. 117—218       19 Claims

ABSTRACT OF THE DISCLOSURE

A coating and impregnating composition suitable for providing a water repellent, abrasion, scratch, chip and dirt resistant coating on a ceramic insulating surface comprising a solvent, a suspension of a resin, a silicone and a partially hydrolyzed tetra-alkyl orthosilicate.

This application is a division of U.S. application Ser. No. 688,974, filed Dec. 8, 1967, now Pat. No. 3,575,916, patented Apr. 20, 1971.

BACKGROUND OF THE INVENTION

In the manufacture of electrical bodies, such as electrically conducting materials, resistors, etc., it has been suggested to insulate the electrical component with a porous ceramic material. These insulating layers are conveniently formed by powder metallurgical techniques or any other method suitable for the formation of a ceramic layer. The materials employed as the insulating layer may be magnesia, alumina, zirconia, berylia, thoria, etc. or mixtures thereof. Since these insulating materials are porous, it is often necessary to provide the outer surface thereof with a sealing layer in order to prevent moisture absorption in the electrical component and to insure insulation.

Heretofore, various materials have been suggested for coating and sealing ceramic insulating materials. Thus, Pat. No. 3,032,444 to Scadron et al., May 1, 1962, suggests the use of a methyl silicone polymer as a sealing composition. Although this composition represents an improvement over the then prior art, there are numerous disadvantages associated with this and other proposed prior art sealing compositions. Although the prior art sealing compositions effectively reduce the porosity of the ceramic insulator, they have a low abrasion, scratch and chip resistance. As a result, during normal use, portions of the sealing layer are abraded away, thereby exposing the underlying insulator and electrical component.

Moreover, many of the proposed prior art sealing compositions are not sufficiently flame-proof to enable their use in high temperature electrical applications. In other words, many of the prior art sealants when employed in connection with electrical components which are subjected to high voltages, burn or are subject to external arcing during operation. In addition, the conventional sealants are not sufficient resistant to arching to permit their commercial use.

The prior art is faced with the difficult problem of providing a sealant composition for ceramic insulators which is not only flame-proof and highly resistant to arcing, but is also scratch, chip and abrasion resistant while providing a high degree of water repellency and being able to effectively seal a porous ceramic substrate.

BRIEF DESCRIPTION OF THE INVENTION

These prior art difficulties are overcome by the present invention. The invention provides a protective impregnant and coating composition for ceramic insulation which is highly abrasion, scratch and chip resistant, water-repellent, dirt resistant, flame-proof, resistant to external arcing and otherwise improves the electrical characteristics of the ceramic insulating material. Briefly, the composition is a low viscosity liquid having a small amount of material in suspension comprising:

(a) a partially hydrolyzed tetra-alkyl orthosilicate,
(b) a resin suspension,
(c) a silicone, and
(d) a solvent which is compatible with (a), (b) and (c).

The invention also relates to electrical components having a ceramic insulation wherein the ceramic insulating material is coated with the above composition.

The above coating composition penetrates the ceramic material, exerts a binding action on the individual ceramic particles, fills the surface pores and deposits an abrasion, scratch and chip resistant glossy or semi-glossy thin, hard film over the ceramic surface which is highly flame-proof and resistant to external arcing.

DETAILED DESCRIPTION OF THE INVENTION

The partially hydrolyzed tetra-alkyl orthosilicate serves to help fill the individual pores in the ceramic material and operates as an adhesive, exerting a binding action on the individual ceramic particles. It also renders the system arc and flame resistant and reduces smoking at very high temperatures. Among the suitable partially hydrolyzed tetra-alkyl orthosilicates are the methyl, ethyl, propyl orthosilicates. The most preferred material is a partially hydrolyzed tetraethyl orthosilicate.

The degree of hydrolysis of the partially hydrolyzed tetra-alkyl orthosilicate is not overly critical. Generally, however, those tetra-alkyl orthosilicates having a higher degree of hydrolysis have been found to be more preferable. The degree of hydrolysis may range from about 10% to about 90%.

The silicone component acts as an adhesive and pore filler while improving the surface finish of the resultant coating. More importantly, the silicone component provides a high degree of chip resistance and water repellence. The particular silicones employed are not overly critical. Any of the well known silicone resins or silicone compositions including solvent and curing agent which is compatible with the remainder of the ingredients may be employed.

Generally, those silicones prepared from trifunctional silanes represented by the following structural formula may be employed:

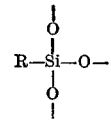

wherein R is an aliphatic or aromatic substituent. It has been found that these silicones combine the best properties of flame and arc resistance with flexibility.

Obviously, where flexibility is not important, those silicones prepared from tetrafunctional silanes may be used. The silicones made from difunctional silanes are, of course, more flexible. It is to be further understood that mixtures of silicones may be employed to produce a particular combination of properties.

It is to be understood also that the term "silicone" is intended to include those commercially available materials which include a solvent or dispersing agent and catalyst or curing agent.

The resin suspension operates to fill surface pores and, more importantly, improves the abrasion and scratch resistance of the resultant coating.

Any resinous material having a low coefficient of friction may be employed. Where a high degree of flame and arc resistance is required, however, it is preferred to employ suspensions of the fluorocarbon resins such as those of tetrafluoroethylene, trifluorochloroethylene, fluorinated ethylene-propylene resins, vinylidene fluoride, copolymers of tetrafluoroethylene and hexafluoropropylene, vinyl fluoride and telomers of tetrafluoroethylene.

It is to be understood, however, that where high flame and arc resistance are not critical, any suitable resin may be employed. Generally, any resin having a relatively low coefficient of friction is suitable to improve the abrasion and scratch resistance of the final coating. Generally, the coefficient of friction (static) may vary from about 0.04 to about 1.00. Suitable non-fluorinated resins, for example, are polyethylene and polypropylene.

The liquid carrier in which the resin is suspended may be any liquid in which the resin is insoluble and which is compatible with the other ingredients of the composition. Among the suitable liquids are toluene, benzene, xylene, etc. As is apparent to those skilled in the art, the selection of the particular dispersing liquid will depend on the resin selected and the remaining ingredients in the coating composition.

The solvent component of the coating composition operates to lower the viscosity and reduce the surface tension of the coating composition. In many cases, the solvent also operates as a stabilizer. Generally, any relatively anhydrous organic solvent which is compatible with the remaining ingredients in the composition may be employed, for example, isopropanol, trichloroethylene, perchloroethylene, n-propanol, ethanol, dichloroethylene, isobutanol, butanol. It is only necessary that the solvent have no solvating effect in the resin component.

The amounts of ingredients in the composition are not overly critical and depend, to a large extent, on the desired properties in the finished coating.

The amounts of partially hydrolyzed tetraalkyl orthosilicate may vary from about 1% to about 95% by weight. At the lower percentages, the flame and arc resistance are lower, thereby decreasing the temperature stability and flammability resistance of the finished article. However, higher percentages increase surface friction and reduce the chip and scratch resistance of the finished coating. Moreover, dirt resistance is lower at the higher percentages. Thus, in those instances where temperature stability and flammability resistance is not a critical necessity, lower percentages of the ester may be employed. In those situations where chip and scratch resistance are of secondary importance and flammability resistance and high temperature stability is a requisite, higher percentages of the ester may be employed. Generally, amounts ranging from about 16% to about 50% by weight provide a good balance of temperature stability properties and chip, scratch and dirt resistant properties.

The amount of silicone employed may vary from about 1% to about 90% by weight. Here, also, the properties desired in the finished coating determine the percentage of silicone employed. At the lower concentrations, the chip, scratch and dirt resistance is lowered. At the higher concentrations, the coating may form a thick layer which is subject to cracking during a curing step where curing is necessary. Also at the higher percentages, the flame and arc resistance are lowered. Accordingly, where flame and arc resistance are not overly critical, higher percentages of silicone may be employed. In those situations where chip, scratch and dirt resistance are not necessary, low percentages of the silicone ingredient may be employed.

The amounts of resin suspension may vary from about 1% to about 75% by weight. The amount of suspension employed is dependent on two factors.

(1) The percentage of resin in the suspension, and
(2) The amount of solvent present in the overall coating composition.

Generally, the amount of resin in the suspension may vary from about 0.1% to about 52%. Lower percentages of the resin suspension in the overall coating composition lowers the abrasion resistance. At the higher percentages, the chip and scratch resistance are increased. The preferred percentages of resin suspension in the final coating composition are from about 7% to about 33%. Since the amount of resin suspension may vary from about 1% to about 75% by weight, and the amount of resin in the suspension may vary from about 0.1% to about 52%, it will be clear that the amount of resin dispersed in the solvent composition will be from 0.1 to 39%.

It will be understood that rather than employing a dispersion of the resin as an ingredient in the coating composition, the resin may be dispersed in the solvent component of the coating composition.

The resin particle size distribution may vary from submicron to about 100 microns. It is necessary also that the solvent and carrier liquid be selected so that the resin particles remain in finely divided suspension form in the the resulting coating composition. In addition to providing a scratch and abrasion resistant surface, the resin particles also operate to enter the pores of the ceramic insulating material and act as a sealant.

The amount of solvent employed may vary from about 1% to about 80% by weight. Large amounts of solvent decrease the chip, scratch and dirt resistance of the final coating but do not lower the coefficient of friction of the ceramic surface to which the coating composition is applied. The employment of small amounts of solvent results in a highly viscous composition which has poor impregnation properties. It is preferred to employ an amount of solvent ranging from about 10% to about 40%.

It is to be understood that by the term "solvent" is meant those liquids which are compatible with the partially hydrolyzed tetra-alkyl orthosilicate and silicone ingredients of the coating composition and are also compatible with the carrier liquid for the resin suspension, where employed, but does not dissolve the resin itself.

Generally, any conventional coating method may be employed to apply the coating compositions of the invention to an electrical component. Among the available methods may be mentioned spraying, fountain, dip coating, electrostatic spraying, painting, etc.

It is also to be understood that conventional pigment and filler additives may also be added to the compositions of the present invention. Among these materials may be mentioned inorganic high temperature pigments such as ferric oxide, cobaltous aluminate and chromium oxide; fillers such as aluminum oxide, silica and mica.

Depending on the particular silicone ingredient employed in the coating composition, it may be necessary to cure the coated article. Thus, there are available various silicone compositions which are dispersions in solutions of the silicone and a curing agent. It will be necessary to effect a heat cure of these compositions. Where required, a curing temperature in the range of from about 150° to about 250° C. may be used.

The method of mixing and the order of addition of the various ingredients of the composition of the present invention are not critical. Any conventional mixing method may be employed to integrate the materials.

EXAMPLE 1

A coating composition having the following formula was prepared:

| | Parts by wt. |
|---|---|
| Partially Hydrolyzed Tetra-ethyl Orthosilicate (Silbond H-4, Stauffer Chemical Company) | 8 |
| Silicone (S2–45C, Midland Industrial Finishes Company) | 5 |
| Isopropanol, anhydrous | 6 |
| Teflon Suspension (MS-142C, Miller-Stephenson Company, 2–3% Teflon in toluene) | 5 |

The above components were found to be completely compatible with one another and the overall composition was found to have an indefinite shelf life at 70° F.

EXAMPLE 2

Several FP–4, 39K tin oxide resistors were coated with a ceramic insulating layer employing a composition comprising aluminum oxide and silicon dioxide fillers, titanium dioxide and cobaltous aluminate pigments, isopropanol and pre-hydrolyzed tetra-ethyl orthosilicate binder. The coated resistors were heat cured to yield a ceramic coating 15 mils in thickness.

The resulting assemblies were impregnated with the coating composition of Example 1 and again heat cured.

The resistors were subjected to overloads of 50X. No evidence of burning, smoking or arcing was observed. The resistors, rather opened the circuit. They were found to be highly resistant to chipping, scratching, abrasion and dirt. When immersed in water, the resistors did not absorb water and when removed from the water, only a few droplets adhered to the surface, indicating a high degree of water resistance.

Ordinary ceramic coated resistors act as a sponge and absorb large quantities of water when immersed.

The impregnating compositons of the invention find applications in fields other than ceramic insulators for electrical components. They may be employed to protect any porous ceramic type material, such as the inorganic zinc based coatings employed to coat hulls, tanks, structural steel, etc. Generally, any ceramic material may be protected by the composition of the present invention.

We claim:
1. An electrical component comprising an electrical material protected by a porous ceramic insulation impregnated, coated and bonded by a composition consisting essentially of:
  from about 1% to about 95% of a partially hydrolyzed tetra-alkyl orthosilicate,
  from about 1% to about 90% of polysiloxane and, in addition to said polysiloxane,
  from about 0.1% to about 39% of resinous particles having a low coefficient of friction, said composition being deposited from an organic liquid, compatible with the components of the composition, in which said resinous particles are dispersed, said resinous particles being insoluble in said organic liquid, wherein all percentages are by weight.

2. The electrical component of claim 1 wherein from about 16% to about 50% of said orthosilicate is present in said composition, and said resinous particles are deposited from a suspension of said resinous particles in said organic liquid which contains from about 1.0 to about 75% of a suspension of the resinous particles comprising from about 0.1% to about 52% resinous particles.

3. The electrical component of claim 1 wherein
  said partially hydrolyzed tetra-alkyl orthosilicate is selected from the group consisting of tetra-methyl, tetra-ethyl and tetra-propyl orthosilicates having a degree of hydrolysis of from about 10% to about 90% present in an amount of from about 16% to about 50%;
  said polysiloxane is derived from a trifunctional silane of the formula

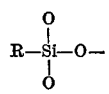

wherein R is selected from the group consisting of an aliphatic and an aromatic substituent;

said composition being deposited from the organic liquid which contains from about 1.0% to about 75% of a suspension of the resinous particles comprising from about 0.1% to about 52% resinous particles, said resinous particles having a size up to about 100 microns and a coefficient of friction, static, of from about 0.04 to about 1.0.

4. The electrical component of claim 1 containing at least about 16% of said partially hydrolyzed tetra-alkyl orthosilicate.

5. The electrical component of claim 1 wherein said organic liquid dissolves said partially hydrolyzed tetra-alkyl orthosilicate and said polysiloxane.

6. The electrical component of claim 1 wherein said resinous particles comprise a resin selected from the group consisting of polyethylene and polypropylene.

7. The electrical component of claim 1 wherein said partially hydrolyzed tetra-alkyl orthosilicate has a degree of hydrolysis of from about 10% to about 90%, said composition being flame-proof and resistant to external electrical arcing.

8. The electrical component of claim 1 wherein said resinous particles have a size up to about 100 microns.

9. The electrical component of claim 1 wherein said partially hydrolyzed tetra-alkyl orthosilicate has a degree of hydrolysis of from about 10% to about 90%.

10. The electrical component of claim 1 wherein said poly-siloxane is derived from a member selected from the group consisting of difunctional, trifunctional and tetra-functional silanes.

11. The electrical component of claim 1 wherein said resinous particles have a coefficient of friction (static) of from about 0.04 to about 1.00.

12. The electrical component of claim 1 wherein said resinous particles comprise a fluorocarbon resin.

13. The electrical component of claim 3 wherein said organic liquid contains from about 7% to about 33% of said suspension.

14. The electrical component of claim 3 where said resinous particles are fluorocarbon resinous particles selected from the group consisting of tetrafluoroethylene, trifluorocholorethylene, fluorinated ethylene-propylene resins, vinylidene fluoride, copolymers of tetrafluoroethylene and hexafluoropropylene, vinyl fluoride and telomers of tetrafluoroethylene.

15. The electrical component of claim 4 wherein said composition is deposited from the organic liquid which contains about 7% to about 33% of a suspension of resinous particles, the suspension comprising about 0.1% to about 52% resinous particles.

16. The electrical component of claim 9 wherein said partially hydrolyzed tetra-alkyl orthosilicate is selected from the group consisting of methyl, ethyl and propyl orthosilicates.

17. The electrical component of claim 10 wherein said silane is a trifunctional silane of the formula:

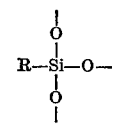

wherein R is selected from the group consisting of an aliphatic and an aromatic substituent.

18. The electrical component of claim 12 where said fluorocarbon resin is selected from the group consisting of tetrafluoroethylene, tri - fluorochloroethylene, fluorinated ethylene-propylene resins, vinylidene fluoride, copolymers of tetrafluoroethylene and hexafluoropropylene, vinyl fluoride and telomers of tetrafluoroethylene.

19. The electrical component of claim 14 where said organic liquid is selected from the group consisting of toluene, benzene and xylene.

References Cited

UNITED STATES PATENTS

| | | | |
|---|---|---|---|
| 2,628,300 | 2/1953 | Berkelhamer | 338—257 |
| 2,725,312 | 11/1955 | Schell | 117—218 |
| 2,813,047 | 11/1957 | Ernst et al. | 117—218 |
| 2,860,222 | 11/1958 | Saltzman et al. | 338—262 |
| 2,865,795 | 12/1958 | Morrison | 117—218 |
| 2,879,183 | 3/1959 | Doherty et al. | 117—218 X |
| 2,885,525 | 5/1959 | Tally et al. | 338—257 X |
| 3,028,347 | 4/1962 | Chevalier | 260—33.4 X |
| 3,062,764 | 11/1962 | Osdal | 260—827 X |
| 3,392,130 | 7/1968 | Rucker et al. | 260—827 X |

WILLIAM D. MARTIN, Primary Examiner

M. R. LUSIGNAN, Assistant Examiner

U.S. Cl. X.R.

117—70 A, 123 D, 161 UF, 161 ZA; 338—257